United States Patent [19]

Bonnemay et al.

[11] 4,145,483

[45] Mar. 20, 1979

[54] ACCUMULATORS INCLUDING HALOGEN ELECTRODES OPERATING WITH FUSED HALIDE BASED ELECTROLYTES

[75] Inventors: Maurice Bonnemay, Boulogne-Billancourt; Guy Bronoël, Versailles; Suzanne Maximovitch nee Fabre, Meudon; Joël Sarradin, Elancourt-Trappes, all of France

[73] Assignee: Agence Nationale de Valorisation de la Recherche (ANVAR), Neuilly-sur-Seine, France

[21] Appl. No.: 832,996

[22] Filed: Sep. 13, 1977

[30] Foreign Application Priority Data

Sep. 13, 1976 [FR] France .................................. 76 27508

[51] Int. Cl.$^2$ ............................................. H01M 10/39
[52] U.S. Cl. ..................................... 429/103; 429/199; 429/218
[58] Field of Search ................. 429/103, 199, 218, 101

[56] References Cited

U.S. PATENT DOCUMENTS

| | | | |
|---|---|---|---|
| 3,607,407 | 9/1971 | Adams | 429/103 X |
| 3,635,765 | 1/1972 | Greenberg | 429/103 X |
| 3,947,291 | 3/1976 | Walsh et al. | 429/103 |
| 4,057,676 | 11/1977 | Rao et al. | 429/199 X |

*Primary Examiner*—Anthony Skapars
*Attorney, Agent, or Firm*—Cushman, Darby & Cushman

[57] ABSTRACT

The invention relates to accumulators comprising halogen electrodes operating with fused halide based electrolyte.

Such accumulators can include an electrochemical chain aluminium/mixture of aluminium halide and alkalin metal halide/metallic derivatives introduced into graphite.

Application to the constitution of accumulators including halogen electrodes for considerable storage of halogen.

17 Claims, 1 Drawing Figure

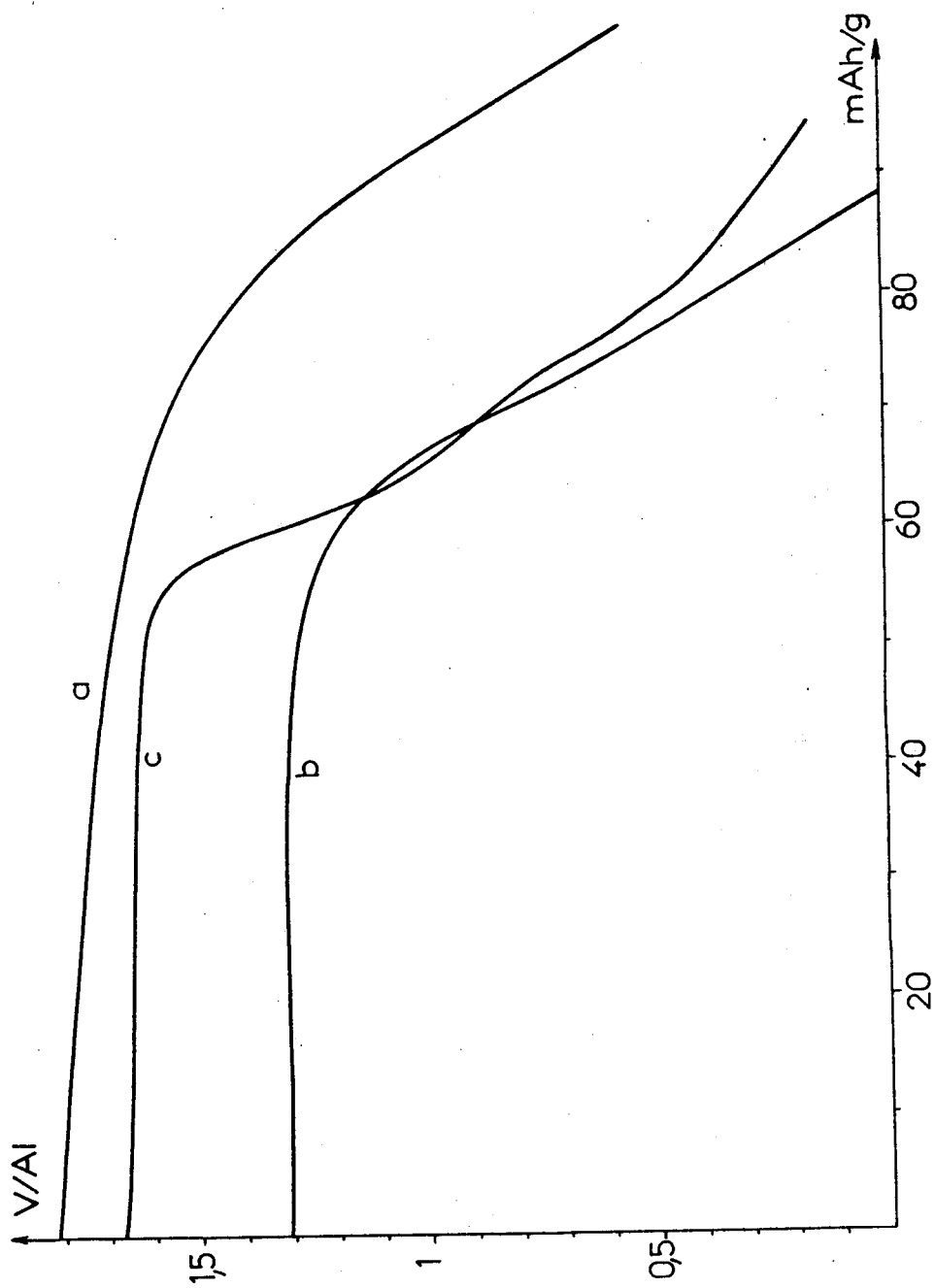

ACCUMULATORS INCLUDING HALOGEN ELECTRODES OPERATING WITH FUSED HALIDE BASED ELECTROLYTES

The Invention relates to improvements in storage batteries or accumulators having halogen electrodes.

It relates more particularly to accumulators of this type operating in electrolytes based on fused halides.

It relates also, as new industrial products, to halogen electrodes applied in accumulators and their methods of manufacture.

The studies carried out on systems using electro-positive metal-halogen couples (or cells) have shown that the latter are capable of providing high energy densities.

Thus, with a cell which has been particularly studied such as Al-Cl$_2$ it is possible to obtain an energy density of the order of 1350 Wh/kg. The theoretical potential of this couple is also high and of the order of 2.1 V.

However, the exploitation of these performances encounters numerous difficulties in practice.

Thus, in the above-mentioned system, the electrodes, generally of carbon, more particularly of graphite, are supplied with gaseous halogen from reservoirs external to the accumulator. It is easily understood that installations provided with such gaseous halogen reservoirs have numerous drawbacks, notably from the point of view of pollution and of safety.

To avoid these drawbacks, the use of the electrolyte itself as a source of halogen has been contemplated.

It was then proposed to use systems operating with electrolytes including fused halides and cathodes formed of materials which do not corrode in the presence of the electrolyte utilised and capable of fixing at least a part of the halogen liberated from the electrolyte during the charging of the battery.

However these systems do not permit interesting performances to be obtained for industrial application on a large scale of the corresponding batteries, notably by reason of the low capacity for fixing halogens of the materials used to constitute the cathodes, namely generally carbon and notably graphites, or again metals or alloys.

The inventors have discovered that it is possible to improve the properties of accumultors operating with electrolytes based on fused halides by modifying the structure of the graphites used up to the present to constitute a positive electrode.

It was therefore an object of the invention to provide electrochemical accumulators comprising halogen electrodes based on modified derivatives of graphite, ensuring excellent halogen retention and whose application permits the obtaining of high performances both on the point of view of energy and life span.

The accumulators according to the invention comprise in combination thereof:
  an electrolyte based on fused salts comprising, on the one hand, at least one metal halide and, on the other hand, a halide or mixture of halides, of at least one alkalin metal,
  a metal anode and
  a halogen cathode based on graphite derivatives of the formula A C$_x$ in which:
    a represents a product suitable for insertion in the mesh or lattice cell of graphite and constituted in particular by a compound M$_y$ B$_z$ in which M represents a metal, B represents an atom of halogen, oxygen, sulfur or an oxyhalogen group, y and z represent the indices corresponding to the stoechiometry of M and B in said compound,
    x represents the number of carbon atoms of the compound, this number not being able to exceed a value corresponding to the saturation of the graphite by the compound A.

Said graphite derivatives are capable, on the one hand, of storing in their structure the halogens formed by oxidation of the halide ions of the electroyte during the charging of the accumulator and, on the other hand, of liberating in the electrolyte said halogens during the discharging of the accumulator, the storage and liberation of the halogens being effected in amounts enabling the production of a discharge current density which is industrially useful.

During the charging of the accumulator, the halide ions of the electrolyte migrate to the cathode where they are oxidised into halogens. Due to the fact of the stretching of the initial lattice of the graphite, resulting from the insertion of the compounds A, in particular of M$_y$B$_z$ above, the halides can enter the graphite structure and be stored therein to a considerable extent.

It is even more remarkable that the graphite halide derivatives thus formed are capable of the easily liberating, during the discharge of the accumulator, the previously stored halogens, thus constituting the substrate source of halogen for the reduction reaction appearing on discharge.

Moreover, the above-said insertion derivatives in the graphite more particularly the oxyhalides, are stable in a fused halide medium. It is thus possible, in the accumulators of the invention, to operate the above-said halogen electrodes with electrolytes based on fused halides, thus exploiting the advantageous properties of the latter, namely notably their operation as to temperatures of about 100° to 200° C. and their excellent conductivity.

In one embodiment of an accumulator according to the invention, there is used an electrolytic chain corresponding to a metal/fused halide/C$_x$ M$_y$ B$_z$ system, in which M, B, y and z have the above-indicated meanings and x is a number of about 4 to about 100.

The insertion derivative of graphite C$_x$ M$_y$ X$_z$ is converted during the charging of the accumulator into a halogenated insertion derivative, by the storing of the halogens formed from the electrolyte. The material constituting the positive electrode of the accumulator then includes derivatives of the formula $$C_x M_y B_z X_a$$

in which M, B x, y and z have the above-indicated meanings, X representing the halogen atom or a mixture of halogen atoms, these halogens corresponding to those present in the electrolytic bath, and a is a number equal at least to about 0.1.

As emphasized above, the meaning of X in the halogenated graphite derivatives which are formed during the operation of the accumulator corresponds to the nature of the one or more halide ions of the electrolyte.

In a preferred embodiment of the invention, recourse has been had to an accumulator including in combination at least one electrolyte based on fused halides comprising at least one aluminium halide and a mixture of halides, notably of chlorides and bromides, of at least one alkaline metal, an anode constituted, at least to a major extent, by aluminium, and a halogen cathode such as explained above.

The electroyte can include a single type of halide or preferably a mixture of halides as a mixture of chlorides and bromides.

In all cases, the halides are advantageously applied in proportions enabling the obtaining of eutectic mixture.

Electrolytes based on chloride or bromide of aluminium and chloride or bromide of sodium or of potassium are particularly suitable. Ternary mixtures including aluminium chloride or bromide, on the one hand, sodium chloride or bromide, on the other hand, as well as potassium chloride and bromide are also suitable.

As regards the anode, it is preferably of aluminium.

As to the cathode, it is advantageously constituted by graphite derivatives of the above-indicated formula $C_x M_y B_z$, in which $M_y B_z$ represents a metal halide, a metal oxide or again an oxyhalide or a metal sulfur.

$M_y B_z$ compounds suitable for separating the graphite structure, as desired according to the invention, are constituted notably by $MoCl_5$, $SbCl_5$, $FeCl_3$, $CrCl_3$, $CrO_3$, $HgCl_2$, $NiCl_2$ and $MoO_2Cl_2$.

During the charging of the accumulator, the material constituting the cathode stores the halogens originating from the electrolyte, and, according to the nature of the halide ions and of the latter, are converted notably either into only chlorinated or brominated derivatives, or into "mixed" derivatives comprising a mixture of chlorine and of bromine.

The operating temperature of the electrode-fused halide based electrolyte systems of the invention is selected so as to enable the production of high potentials and capacities.

This temperature is advantageously above the melting point of the eutectic utilised, to avoid any solidification of the constituents of the electrolyte due to local variation in concentration. Thus, for binary eutectic mixtures, the temperature is advantageously above 110° C. and, for ternary eutectic mixtures above 70° C.

The upper limit of the margin of temperature in which it is possible to operate advantageously depends on the decomposition temperature of the material forming the halogen electrode, in general is below 200–250° C.

By means of the invention, remarkably reversible systems are provided, in which the halogen electrodes show good behavior, even under very severe charging and discharging conditions.

These high performances of the accumulators of the invention result more particularly from the application of the above-indicated modified graphites whose utilization as materials for halogen electrodes comes within the scope of invention. Similarly, the above halogenated graphite derivatives, which constitute "charged" electrodes, form part of the invention.

For the constitution of electrodes from graphite derivatives in powder form, recourse is had to the customary methods. It is notably possible to keep the pressed powder in a perforated tube of steel or the like, which assures the maintenance of good conductibility of the insertion derivatives in the graphite and avoids a too considerable disaggregation. It is also possible to mix the powder with a polymer whose cross-linking ensures the cohesion of the whole.

The invention provides also a process for the preparation of these halogen derivatives, according to which there is imposed on a metal/fused halide/$C_x M_y B_z$ electrolytic chain, a sufficient charge to obtain the desired introduction of halogen into the graphite insertion derivatives.

To illustrate the invention, the examples are given below relating to the preparation of halogenated graphite insertion derivatives and their use as halogen electrodes in electrochemical accumulators.

In the course of these examples, reference is made to the single FIGURE which represents the discharge curve obtained with an insertion derivative in the graphite.

EXAMPLE 1 — Preparation of chlorinated derivatives of $MoCl_5\text{-}C_{34}$.

In a first step, the insertion compound of the graphite $MoCl_5\text{-}C_{34}$, is prepared according to methods known in themselves and notably according to the methods described by Croft in Aust. J. Chem. 9, 189 and 194 (1956) using as graphite natural Ceylon graphite.

This method consists essentially of heating the powder metal in a flow of dry halogen, and reacting, in a tube, with the graphite, the sublimed halide formed, by using an excess of the latter. The reaction mixtue is then brought, in the sealed tube, to a sufficient temperature for the occurence of the insertion of the metal halide into the graphite.

50 mg of powder of $MoCl_5\text{-}C_{34}$ are then used to constitute a halogen electrode in an eletrochemical cell. This is a teflon cell formed from a container closed hermetically by a cover and including, in addition to the halogen electrode to be studied, a reference electrode of aluminium, as well as an auxiliary electrode of aluminium of which it has been shown that the potential work was stable.

The material constituting the halogen electrode is pressed between a molybdenum collector and a scintered glass separator and then has an apparent surface of 1 $cm^2$.

The electrolyte applied is constituted by 66% of aluminium chloride and 34% of sodium chloride.

The cell is kept in a heating oven, and provided with a thermometer for checking the temperature which is 140° C. for the test carried out.

A constant charge is applied to the $MoCl_5\text{-}C_{34}$ with a current of 10mA for about 10 hours. At the end of the charging a mixed insertion compound is obtained of $MoCl_5$ and chlorine in graphite whose formula is close to $MoCl_5\text{-}C_{34}\text{-}Cl_{3,05}$.

On the mixed insertion compound thus formed the cathode current of 3 mA is then applied. The discharge curve is brought on the single FIGURE and designated by a. The discharge obtained, which corresponds to the reduction of the chlorine previously inserted into the graphite lattice is 120 mAh/g of $MoCl_5\text{-}C_{34\ 1\ material}$.

The "useful" capacity, determined by limiting the integration of the curve at a potential with respect to the aluminium reference electrode of 1.2 V, is 90 mAh/g of $MoCl_5\text{-}C_{34}$ material.

The table below mentions chlorinated derivatives prepared as indicated above, the tungsten and chromium derivatives being however prepared at 170° C. For each of these derivatives, the total and useful capacities are indicated. By way of comparison, there are reported also the results obtained by using as halogen electrodes, a conventional electrode constituted from graphite, the electrochemical conditions applied in this test being identical with those described above.

TABLE

| material of the halogen electrodes | | total capacity | useful capacity |
|---|---|---|---|
| before charging | after charging | in mAh/g of metal insertion compound | |
| graphite | graphite + chlorine | 70 | 45 |
| $SbCl_5$—$C_{24}$ | $SbCl_5$—$C_{24}$—$Cl_{1.52}$ | 90 | 65 |
| $FeCl_3$—$C_{7.4}$ | $FeCl_3$—$C_{7.4}$—$Cl_{0.84}$ | 160 | 75 |
| $WCl_6$—$C_{67}$ | $WCl_5$—$C_{67}$—$Cl_{3.5}$ | 80 | 65 |
| $CrCl_3$—$C_{13.5}$ | $CrCl_3$—$C_{13.5}$—$Cl_{0.9}$ | 95 | 65 |
| $NiCl_2$—$C_5$ | $NiCl_2$—$C_5$—$Cl_{0.56}$ | 200 | 80 |

Examination of the results reported in this table show that the capacities obtained with the insertion derivatives applied according to the invention are higher than those obtained with the pure graphite.

It is observed that for compounds such as $NiCl_5$-$C_5$ and $FeCl_3$ $C_{7.4}$, the total capacity is particularly high due to the fact of the reduction of the metal compound.

EXAMPLE 2 — Preparation of brominated derivatives of $MoCl_5$-$C_{34}$.

Procedure is according to example 1. However, the electrolyte is constituted, in this case, by 66% of aluminium bromide, 20% of sodium bromide and a temperature of 110° C. is used.

As to the charging of the electrode material, it is effected with a current of 0.5 mA for about 16 hours.

The brominated derivatives obtained at the end of charging has a formula closed to $MoCl_5$-$C_{34}$-$Br_{2.3}$. Its discharge curve corresponds to b in the Figure and shows a well defined plate. The total capacity and useful capacity of this derivative are respectively 90 and 60 mAh/g of $MoCl_5$-$C_{34}$.

By operating under the same electrochemical conditions, but by using a conventional halogen electrode constituted by natural graphite, there are obtained, after charging, total and useful capacities of 60 and 35 mAh/g respectively.

As in the case of chlorine derivatives, by comparing the results observed with graphite and those observed with a graphite insertion derivative, it is noted that the application of the latter enables improvement of the performance of accumulators operating with fused halides as electrolytes.

EXAMPLE 3 — Preparation of brominated and chlorinated derivatives of $MoCl_5$-$C_{34}$.

Procedure is as described in example 1 but a 110° C., with an electrolyte formed from 20% of sodium chloride, 60% of aluminium chloride and 20% of sodium bromide, and by effecting the charging with a current of 3 mA for about three hours. A halogen derivative is obtained whose formula is close to $MoCl_5$-$C_{34}$-$(Cl_bBr_c)$ in which b+c = 2.3. Its potential after charging is 1.72 V, its total capacity and its useful capacity are respectively 90 and 60 mAh/g. The discharge curve of the halogen derivatives is referenced c in the Figure and shows a well defined plate.

EXAMPLE 4 — Study of the electrochemical properties of the insertion compounds of graphite in a chloroaluminate medium.

(1°) A mixture of anhydrous ferric chloride and of graphite in proportions such that there was at least 163 g of Fe $Cl_3$ per 72 g of graphite, are constituted. This mixture was slightly compressed so that the electrical contact with an inner collector was correct and that there existed a porosity capable of being impregnated by the electrolyte. The electrolyte was constituted by the molar mixture of Al $Cl_3$ 60%, K Cl 20%, Na Cl 20%. The electrolyte was brought to a temperature of 140° C.

The electrode thus constituted was subjected to several charging and discharging cycles so that the potential at the end of the charging was of the order of 2.1 V and on discharging never less than 1.6 V, the charging and discharging currents being of the order of 10 mA for a total weight of mixture of 50 mg, the apparent surface being 1 cm2.

After several cycles the formation of an insertion compound of a formula closed to Fe $Cl_3$-$C_6$ was observed.

(2°) An electrode essentially constituted of the compound Fe $Cl_3$-$C_6$, this compound being produced as described above by the electrochemical route or by a conventional chemical method, has in a chloroaluminate medium or in an electrolyte of the type: Al $Cl_3$, KBr, Na Br, the characteristic of being able to be partially reduced to a potential comprised between 2 v and 2.1 providing a quantity of electricity of the order of 120 Ah/kg. (The potentials are expressed with respect to the aluminium electrode in equilibrium in the electrolytic medium concerned.)

Generally there was observed a substantially horizontal plate (the average potential being 1.7 V) for a discharge current of 10 mA affecting 50 mg of compound.

A quasi-invariance of the quantity of electricity collected as a function of the charging-discharging cycle imposed on the electrode (according to the conditions defined in 1°) was observed—Moreover this electrode kept in its charging state without being polarised for 24 h showed in a subsequent discharging that it has preserved its capacity.

(3°) Properties which are also interesting with respect to the recoverable electrical capacity and to the invariance of the latter as a function of the cycling were found with an electrode constituted initially by a mixture of the Cu $Cl_2$ and the graphite (with the weight of Cu $Cl_2$ above 135 g for 70 g the graphite). In this case it was observed that good results are obtained when the charging rate is such that the potential at the end of charging reaches 2.5 V.

It is evident from all of the foregoing results that the graphite derivatives applied according to the invention show good halogen storage properties, whether this is of chlorine, of bromine, or of a mixture of thesehalogens, and that their use as halogen electrodes, in electrochemical accumulators, enables improvement to a great extent of the performances of the latter.

EXAMPLE 5 — Preparation of chlorinated and brominated derivatives of $MoO_2Cl_2$-$C_n$.

Said compound is prepared by heating, at a temperature of about 350–500° C., a mixture of $MoO_3$ and $MoCl_5$ in the presence of graphite.

$MoO_2Cl_2$ is simultaneous formed and inserted.

Procedure is as described in example 1, but at 90° C., with an electrolyte formed from 20% of NaCl, 20% of KBr and 60% of $AlCl_3$.

A constant charge is applied to the $MoO_2Cl_2$-$C_n$ with a current of 10 mA for about 1 hour.

The "useful" capacity is 80 mAh/g. After 60 cycles, none capacity decrease is observed.

We claim:

1. Accumulator comprising in combination:

an electrolyte based on fused salts comprising at least a metal halide and a halide or a mixture of halide, of at least one alkaline metal, a metal anode and a halogen cathode based on graphite derivatives of the formula: $A C_x$, in which A represents a product able to be introduced into the graphite lattice cell and constituted in particular by a compound $M_y B_z$ in which M represents a metal, B represents an atom of halogen, of oxygen, of sulphur or an oxyhalide group, y and z representing the indices corresponding to the stoechiometry in said compound, x represents the number of carbon atoms of the compound, this number not being able to exceed a value corresponding to the saturation of the graphite by the compound A, wherein said electrolyte does not consist of fused salts of $Al\ Cl_3$ and an alkaline metal chloride when said compound $M_y B_z$ is $W\ Cl_6$ or $Al\ Cl_3$, said graphite derivatives being capable of storing in their structure the halogens formed by oxidation of the halide ions of the electrolyte on charging the accumulator and releasing in the electrolyte said halogens on discharging the accumulator, the storage and release of halogens having to be effected in amounts enabling the production of a discharge current density which is industrially useful.

2. Accumulator according to claim 1, characterized by the electrochemical chain metal/fused halides/$C_x M_y B_z$ in which, M, B, y and z have the above-indicated meanings and x is a number from about 4 to about 100.

3. Accumulator according to claim 1, characterised by the fact that it comprises in the charged state a halogen electrode formed by a material corresponding to the formula $$C_x M_y B_z X_a$$

in which M, B, x, y and z have the above-indicated meanings, X represents a halogen atom or a mixture of halogen atoms, these halogens corresponding to those present in the electrolytic bath, and a is a number equal to at least about 0.1.

4. Accumulator according to claim 3 characterized by the fact that X represents chlorine.

5. Accumulator according to claim 1 characterized by the fact that the anode is constituted, at least to a major extent, by aluminum.

6. Accumulator according to claim 5, characterized by the fact that the used electrolyte is based on a eutectic mixture of at least one aluminum halide, and of a mixture of halides, preferably of bromides and chlorides of at least one alkaline metal.

7. Accumulator according to claim 3, characterized by the fact that it comprises in the charged state a halogen electrode formed by a material selected from the group of derivatives having a formula of $MoCl_5\text{-}C_{34}\text{-}Cl_{3.05}$, $SbCl_5\text{-}C_{24}\text{-}Cl_{1.52}$, $NiCl_2\text{-}C_5\text{-}Cl_{0.56}$, $MoCl_5\text{-}C_{34}\text{-}Br_{2.3}$, $MoCl_5\text{-}C_{34}\text{-}(Cl_b\text{-}Br_c)$ where b+c is equal to 2.3 and $FeCl_3\text{-}C_{7.4}\text{-}Cl_{0.84}$, $CrCl_3\text{-}C_{13.5}\text{-}Cl_{0.9}$.

8. Halogen electrode characterized by the fact that it comprises an intercalar derivative of the formula $C_x M_y B_z X_a$ such as defined in claim 3.

9. Process for insertion of a halogen derivative in graphite of formula $C_x M_y B_z X_a$ in which M represents a metal, B represents an atom of halogen, of oxygen of sulphur or an oxyhalide group, y and z represent the indicies corresponding to the stiochiometry in said compound, x represents the number of carbon atoms of the compound and X represents a halogen atom or a mixture of halogen atoms, these halogens corresponding to those present in the electrolytic bath, and a is a number equal to at least about 0.1 by heating and charging the electrolytic chain in metal/fused halide/$C_x M_y B_z$, in which M, B, x, y and z have the above-indicated meanings, while maintaining the heating at a potential difference to insert a halogen in the graphite structure of the cathode and maintaining said charge to obtain the formation of an insertion compound in graphite.

10. Process of preparing a metallic oxyhalide compound in graphite, comprising the heating at a temperature sufficient for simultaneously obtaining the formation and the insertion of the oxyhalide compound from a mixture of an oxide and a halide of the corresponding metal in graphite.

11. Accumulator according to claim 1 wherein $M_y B_z$ is a metal halogenide or metallic oxide selected from the group consisting of $MoCl_5$, $SbCl_5$, $FeCl_3$, $CrCl_3$ and $NiCl_2$.

12. Accumulator according to claim 2 wherein the fused halogenides are chlorides.

13. Accumulator according to claim 2 wherein the fused halogenides are bromides.

14. Accumulator according to claim 2 wherein the fused halogenides consist of a mixture of chlorides and bromides.

15. Accumulator according to claim 3 wherein X is bromine.

16. Accumulator according to claim 3 wherein X is a mixture of chlorine and bromine.

17. A halogen storage electrode comprising graphite derivatives of the formula $AC_x$ wherein A represents a product able to be introduced into the graphite lattice cell and constituted in particular by a compound $M_y B_z$ in which M represents a metal, B represents an atom of halogen, of oxygen, of sulphur or an oxyhalide group, y and z representing the indicies corresponding to the stiochiometry of said compound, x represents the number of carbon atoms of the compound said number not being able to exceed a value corresponding to the saturation of the graphite by the compound A.

* * * * *